(12) United States Patent
McGee et al.

(10) Patent No.: US 6,827,763 B2
(45) Date of Patent: Dec. 7, 2004

(54) FILTER FOR A GAS ANALYZER (75) Inventors: Phillip McGee, Owatonna, MN (US); Robert Kochie, Mantorville, MN (US); Durval S. Ribeiro, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 14 days.

(21) Appl. No.: 10/322,515

(22) Filed: Dec. 19, 2002

(65) Prior Publication Data

US 2004/0060440 A1 Apr. 1, 2004

Related U.S. Application Data (60) Provisional application No. 60/413,736, filed on Sep. 27, 2002.

(51) Int. Cl.[7] .......................... B01D 29/56; B01D 46/12
(52) U.S. Cl. .......................... 95/287; 55/356; 55/385.1; 55/485; 55/486; 55/498; 55/527; 55/DIG. 42
(58) Field of Search .............................. 95/273, 286, 2, 95/87; 55/356, 385.1, 485–487, 495, 498, 502, 527, 528, DIG. 42

(56) References Cited

U.S. PATENT DOCUMENTS

| 3,002,870 A | * | 10/1961 | Belgarde et al. ............... 156/70 |
| 3,527,027 A | * | 9/1970 | Knight et al. .................. 96/134 |
| 3,772,857 A | * | 11/1973 | Jackson et al. ................ 55/418 |
| 3,802,160 A | * | 4/1974 | Foltz ............................ 95/273 |
| 4,256,474 A | * | 3/1981 | Berger et al. .................. 96/152 |
| 4,259,097 A | * | 3/1981 | Patel et al. ..................... 96/136 |
| 4,692,175 A | * | 9/1987 | Frantz .......................... 96/408 |
| 4,810,269 A | * | 3/1989 | Stackhouse et al. ........... 96/381 |
| 4,838,903 A | * | 6/1989 | Thomaides et al. ........... 95/286 |
| 5,114,447 A | * | 5/1992 | Davis ........................... 55/485 |
| 5,141,533 A | * | 8/1992 | Sowinski ..................... 95/147 |
| 5,423,892 A | * | 6/1995 | Kahlbaugh et al. ........... 55/320 |
| 5,540,617 A | * | 7/1996 | Siegel et al. ................. 454/158 |
| 5,653,870 A | * | 8/1997 | Tsuchiya et al. ............ 210/232 |
| 5,800,597 A | * | 9/1998 | Perrotta et al. .................. 96/9 |
| 5,922,105 A | * | 7/1999 | Fujii et al. ...................... 95/63 |
| 5,993,743 A |   | 11/1999 | Nordman et al. ............. 422/94 |
| 6,093,237 A | * | 7/2000 | Keller et al. .................. 95/287 |
| 6,187,073 B1 | * | 2/2001 | Gieseke et al. ............... 55/485 |
| 6,409,804 B1 | * | 6/2002 | Cook et al. .................... 95/273 |
| 6,540,805 B2 | * | 4/2003 | Ohno et al. ................... 55/486 |

* cited by examiner

Primary Examiner—Robert H. Spitzer
(74) Attorney, Agent, or Firm—Baker & Hostetler LLP (57) ABSTRACT A method and apparatus for filtering particulate and condensation are provided. The filter is a multi-state filter that reduces contamination from sources other than the desired source by having its filtering components encased and compacted together.

21 Claims, 9 Drawing Sheets

FILTER FOR A GAS ANALYZER

PRIORITY CLAIM

This application claims benefit of U.S. provisional patent application Ser.No. 60/413,736, filed on Sep. 27, 2002, the disclosure of which is incorporated herein by reference.

FIELD OF THE INVENTION

Embodiments of the present invention generally relate to a filter. More specifically, a multistage filter for use with a gas analyzer such as a hand held gas analyzer.

BACKGROUND OF THE INVENTION

Gas powered vehicles produce emissions of various gases leading to pollution of the air. Most states require yearly vehicle inspections as part of the privilege in driving in their states. However, some states, such as California, have required stricter emission standards for the vehicles of their citizens. Thus, testing facilities and repair garages are performing more tests as the regulations become tighter.

In the past, only hydrocarbons (HC) and carbon monoxide (CO) had to be measured, but stricter regulations require the measurement of oxygen ($O_2$), carbon dioxides ($CO_2$) and nitrous oxides (NOx), as well. The vehicle must pass inspection, including emissions testing, in order to obtain a valid inspection sticker. If the vehicle fails, then it must be repaired before it will pass inspection. In the repair process, a mechanic must be able to determine if the repair of the gas emission system was successful.

Gas analyzers have been developed in order to help the mechanic diagnose the emission problems. Large platform analyzers were originally developed to measure the emission gases and were moved around on carts. However, large platform analyzers are too large for small garages to use and store. Additionally, the large platform analyzers are typically very expensive for small repair garages to own.

"Portable" gas analyzers were subsequently developed to be used for repair purposes. While the portable gas analyzers were smaller, they still weigh between twenty-thirty pounds and are too large to be held in the operator's hands. Because the portable analyzers were still big, they required a big pump to move the emission gases throughout the analyzer for measuring, and a large filtering device to filter the particulate and moisture from the emission gases. The big pump also required a large power source, thus increasing the weight of the portable gas analyzer. Additionally, the portable gas analyzer has a large chassis to hold the various components together. The large size of the chassis increases the weight of the analyzer.

As the analyzer operates, emission gases including condensation from the line (due to a hot emission source traveling in hoses that are at ambient temperature) are filtered through a filter. However, the analyzer can have many filters that require additional hoses so that additional contamination and condensation leading to false readings can occur.

In order to circulate the emission gases, a pump is utilized. However, the pump can be big because of the size of the analyzer. The pump is solidly mounted onto the chassis. Additionally, the pump vibrates, thereby, transmitting the vibration to the operator, and making it uncomfortable for the operator to use the analyzer.

In another aspect of the invention, a method for filtering gases in a gas analyzer device is provided including receiving a gas in a filter holder having an upper portion and a lower portion. The gas passes through a first filter element located in the upper portion of the filter holder and a second filter element located in the lower portion of the filter holder.

Therefore, there is a need for an analyzer that can be lightweight, compact, and portable. There is also a need for an integrated multistage filter system to reduce contamination and condensation. Additional needs include an analyzer that can notify the operator that it is in the wrong orientation for better purging and for an analyzer with reduced vibration from the pump so that the analyzer is more comfortable to use. There is a further need for an analyzer that can purge and recalibrate ("zero out").

SUMMARY OF THE INVENTION

Embodiments of the present invention generally provide for an analyzer that is portable, lightweight and compact and includes a multistage filter. The analyzer can have an orientation component, can have less vibration, and can purge and/or zero manually or automatically.

In one aspect, the invention provides a multi-stage filtration assembly for a gas analyzer system including a filter holder forming a chamber having a lower portion and an upper portion. A filter element having a first filter and a second filter is located in an upper portion and lower portion of the chamber, respectively. The filtration assembly may also provide the first filter as a two stage particulate filter comprising an inner filter element and an outer filter element.

In another aspect of the invention, a method for filtering gasses in a gas analyzer device is provided including receiving a gas in a filter holder having an upper portion and a lower portion. The gas passes through a first filter element located in the upper portion of the filter holder and a second filter element located in the lower portion of the filter holder.

In yet another aspect of the invention, a multi-stage filtration system for a gas analyzer system is provided including a means for receiving a gas in a filter holder having an upper portion and a lower portion, a means for passing the gas through a first filter element located in an upper portion of the filter holder, and a means for passing the gas through a second filter element located in the lower portion of the filter holder.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The embodiments of the present invention relate to a portable analyzer that is portable, lightweight and compact. The analyzer is constructed and arranged so that lightweight components can be selected and are made up of lightweight materials. The analyzer can also determine its orientation so that efficient purging of contaminants and liquids are conducted. An efficient integrated filter is also provided to filter contaminants and liquids, such as water, from the emission gases. Additionally, the embodiments include reducing the vibration of components of the analyzer during operation, such as the pump, and to purge and zero out the analyzer.

Figure 1:
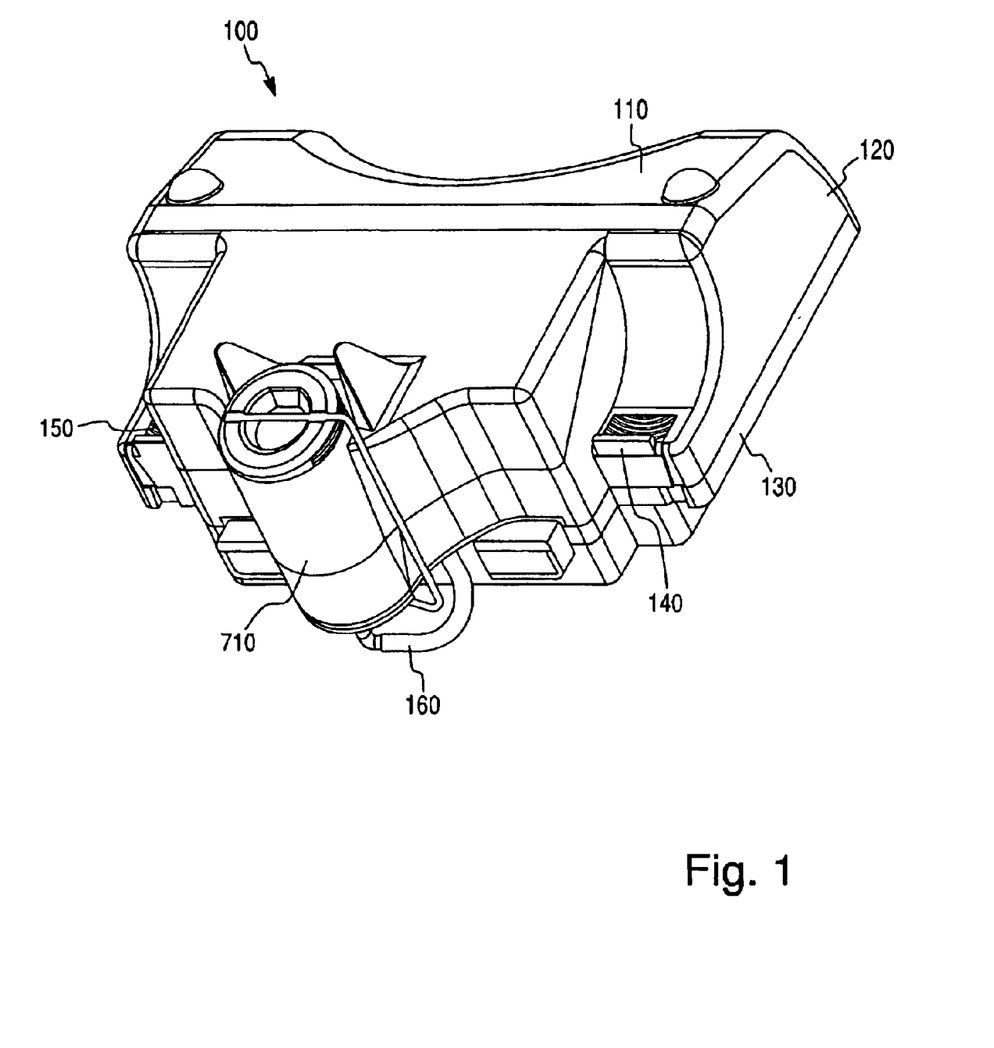
FIG. 1 is a perspective view of a portable analyzer according to an embodiment of the invention.

FIG. 1 is a perspective view of a portable analyzer 100 according to an embodiment of the invention. The analyzer 100 includes a housing 110 having an upper portion 120 and a lower portion 130. Moveable latches 140 are provided in the upper portion 120 to couple to another device, such as the Genisys™ (from Service Solutions, Owatonna, Minn.). The latches 140 include grooves 150 on an upper surface and can be easily coupled or uncoupled with another device. A filter 710 (greater detail in FIG. 7) is provided having an inlet hose 160 that can receive gases, such as emission gases from a vehicle, and an outlet to exhaust the gases after analysis and to exhaust contaminates, including water.

In one embodiment of the invention, the portable analyzer 100 is lightweight and small enough to be comfortable in a hand(s) of the operator. Preferably the analyzer 100 weighs about 2 pounds or less and has dimensions of about 6.4 inches (length) by 4.9 inches (height) by 3.9 inches (depth). The analyzer 100 can weigh less because the housing 110 is preferably made from a lightweight polymer that is resistant to particles, such as dusts, from accumulating on the surface. The polymer can be acrylonitrile butadiene styrene (ABS) plastic. ABS is a strong, high-density plastic that is resistant to particles sticking to its surfaces, hence, contamination and the weight of the analyzer are decreased.

With the use of a smaller manifold (FIG. 2), the various components of the analyzer 100 will have to be smaller and thus lighter. Because the components can be smaller and lighter, the analyzer weighs less and is smaller in dimensions. Due to the analyzer 100 being lighter and smaller than conventional analyzer, more can be on hand in smaller garages because it takes less storage space. Because of the reduced weight and dimensions, the analyzer 100 is cheaper to ship, which saves money for consumer, and can be held by the operator for a longer period of time than a heavier analyzer.

Figure 2:
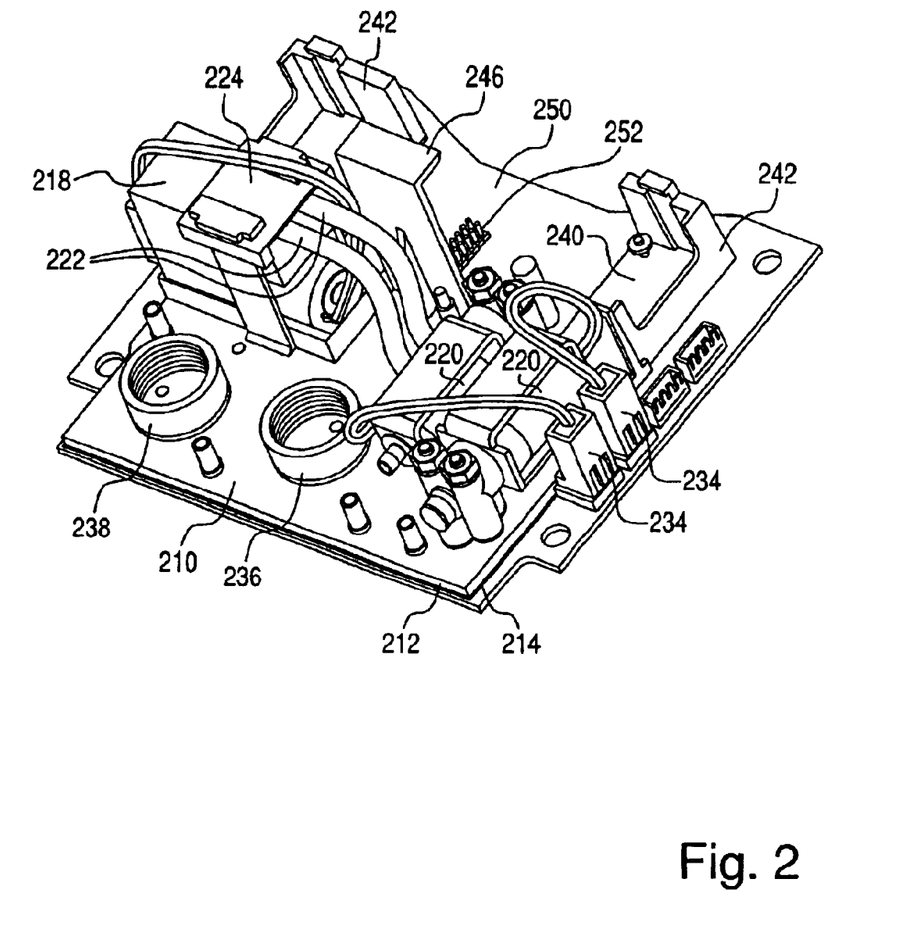
FIG. 2 is a perspective view of an embodiment of a manifold with components thereon.

FIG. 2 is a perspective view of an embodiment of a manifold 210 with components thereon. The upper and lower portions 120 and 130 have been removed to illustrate an embodiment of the manifold 210 of the present invention. Conventional analyzers have a chassis coupled to the manifold 210 thereby, making it heavier. In one embodiment, the chassis is removed and is no longer coupled to the manifold 210 in order to decrease the weight of the analyzer 100. The manifold 210 is smaller than conventional manifolds and includes gas passages therein to allow gases to travel throughout the analyzer 100 until it is exhausted out. Manifold 210 can be made from a strong lightweight material, such as ABS. Because the manifold 210 is made from ABS and is smaller than conventional manifolds, the analyzer 100 is lighter and smaller in dimensions.

Figure 4:
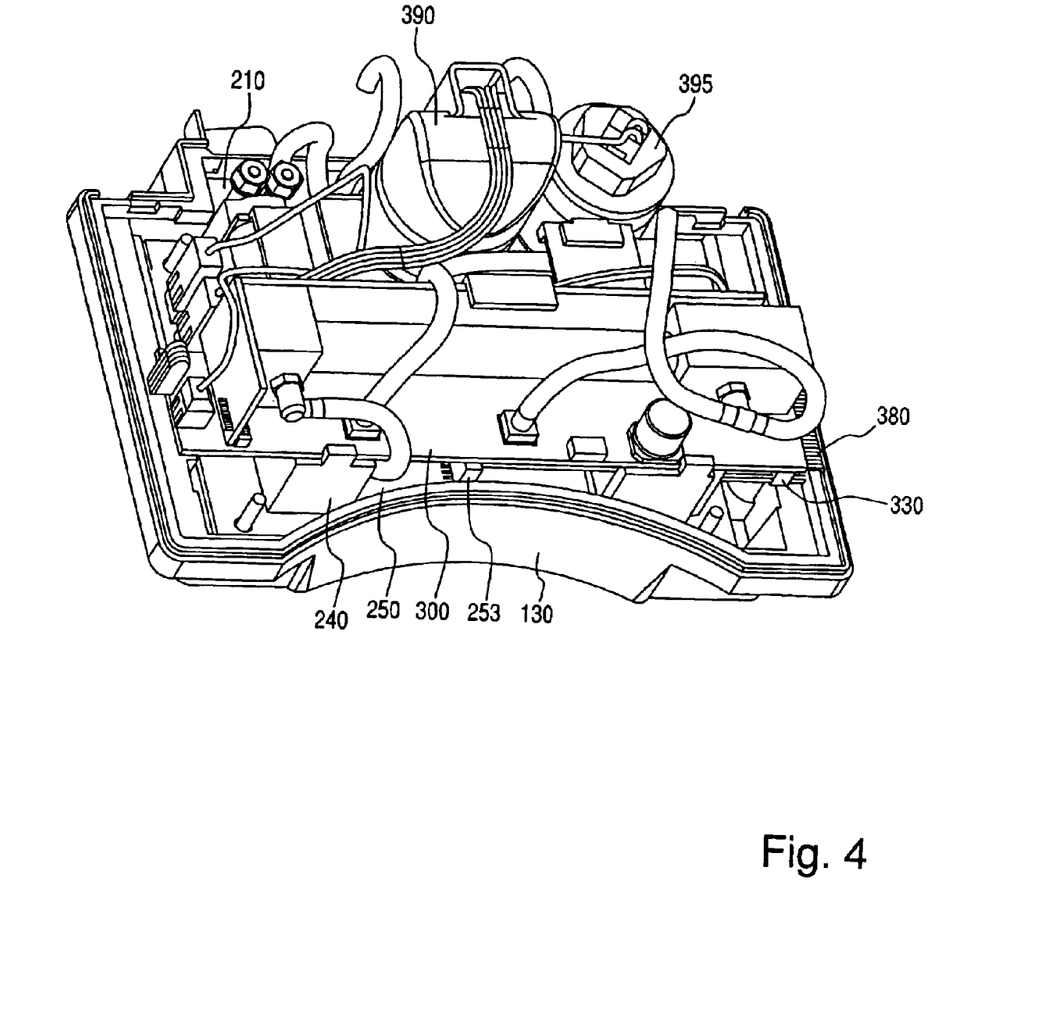
FIG. 4 illustrates the analyzer with the upper portion of the housing removed.

The manifold 210 mounts onto a circuit board 250, which has a connector 252 that connects with a ribbon cable 380 (FIG. 4). The manifold 210 includes a plate 212 and a manifold gas cap 214, which are ultrasonically welded together using known methods. The ultrasonic welding prevents gases from escaping the manifold 210. The plate 212 provides a platform for coupling other analyzer components, such as a pump 218 or solenoids 220. The gas cap 214 provides passages for gases to travel beneath the plate 212, so that the gases can travel to the various components.

The pump 218 is a positive displacement pump that helps to circulate the emission gases throughout the analyzer 100. Hoses 222 bring gases to and from the pump 218 for circulation. The pump 218 is secured on the manifold 210 by an assembly 224 (details in FIG. 6) so that it does not travel during operation.

Solenoids 220 are also mounted on the manifold 210 and help to direct the gases in the right direction toward the appropriate components, such as the pump 218. One solenoid is the zero solenoid, which helps to zero out the sensors (described below) before a sample of the emission gases are analyzed. The zero solenoid is connected to an outside source of ambient gas that will be used as the control gases. The other solenoid is the purge solenoid, which purges the contaminants and liquids from the filter 710. The solenoid directs the air from the pump to the filter 710 to force the contaminants and liquids from the filter. The solenoids' 220 are powered by power sources 234.

The manifold 210 can include a NOx sensor coupler 236 and an $O_2$ sensor coupler 238 mounted thereon. The couplers 236 and 238 can provide a threaded connection for their respective sensors. The NOx sensor 390 (FIG. 4) senses the presence and concentration of the NOx in the emission gases in parts per million (p.p.m.) and relays the data to a controller. Like the NOx sensor 390, the $O_2$ sensor 395 (FIG. 4) senses the presence and concentration of $O_2$ (p.p.m.) in the emission gases and relays the data to the controller.

A bench 300 (FIG. 3) which contains other sensors is not shown, but is placed on the circuit board 250 and secured by the bench assembly 240, which is mounted to the circuit board. The bench assembly 240 includes holders 242 located at the ends of the circuit board 250 and a clamp 246. The holder 242 supports the base 310 (FIG. 3) of the bench 300 and the clamp 246 clamps on a wall 320 (FIG. 3) of the bench.

Figure 3:
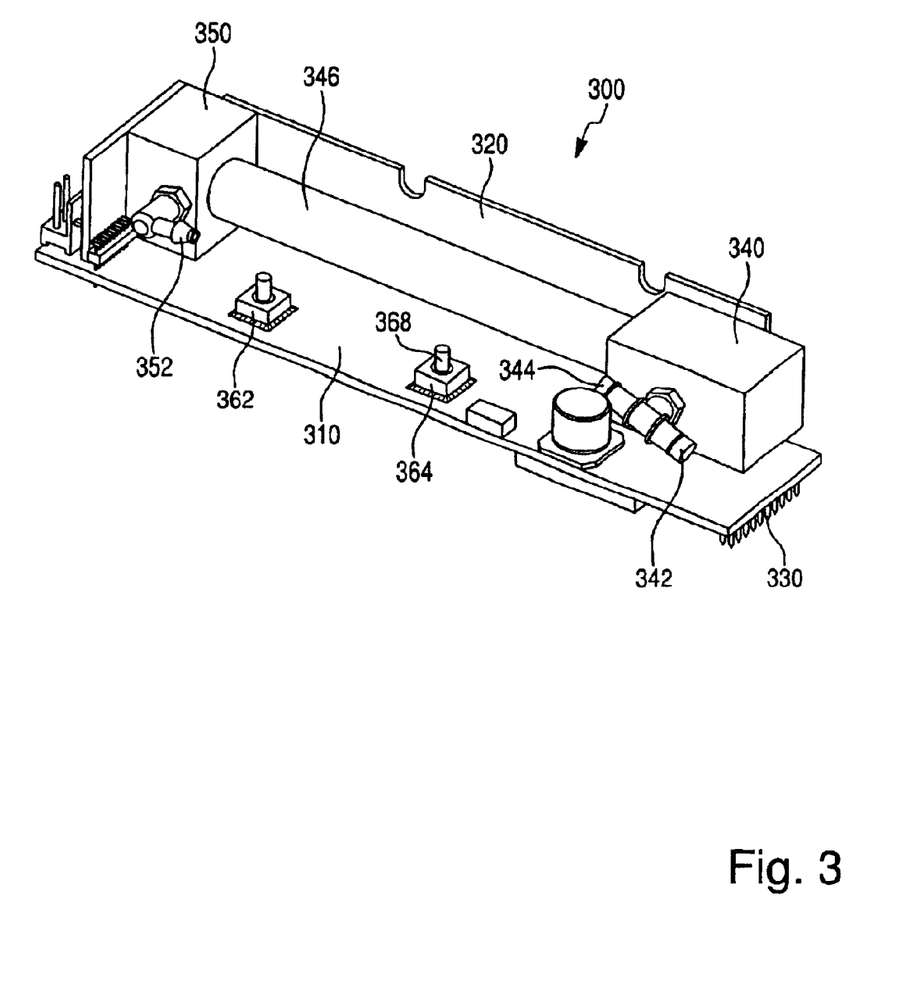
FIG. 3 illustrates a perspective view of an embodiment of a bench of the present invention.

FIG. 3 illustrates a perspective view of an embodiment of the bench 300 of the present invention. The bench 300 includes the base 310 and the wall 320 that mate with the holders 242 and clamp 246, respectively. An emitter 340 transmits non-disperse infrared (NDIR) along a tube 346 containing emission gases. The tube 346 can have an outer surface of brass and an inner surface plated with gold. Gold is preferable because it does not react with the emission gases. The emitter 340 can send the emission gases to the manifold 210 via connector 344. Additionally, the emitter 340 is in communication with an absolute pressure transducer 364 via a hose (not shown) that connects a connector 342 with the connector 368. The absolute pressure transducer 364 is a flow determiner to ensure that the tested gas flow is adequate for an accurate measurement. The type and concentration of the emission gases (such as CO, $CO_2$ and HC) can be measured by the absorbance of the NDIR's wavelength in the gases by a receiver 350. A zero reference is provided by a separate beam so that a chopper motor (that blocks the beam for a zero reference) is not required, thus making the analyzer 100 lighter. The emissions gases are exhausted from the receiver 350 via outlet 352 to continue its normal course.

The absolute transducer 364 and a differential transducer 362 are present on the base 310. The absolute pressure transducer 364 includes the connector 368 that can communicate with the emitter 340 via a hose. The differential transducer 362 provides altitude data for the analyzer 100 that can affect the reading. An interface 330 that can connect to the circuit board 250 through the ribbon cable 380 (FIG. 4) can relay data collected by the components of the bench 300.

FIG. 4 illustrates the analyzer 100 with the upper portion 120 of the housing 110 removed. The lower portion 130 contains the bench 300, the circuit board 250 and the manifold 210. Bench 300 is shown mated with the bench assembly 240 and the interface 330 is connected to the ribbon cable 380, which is connected to connector 253 on the circuit board 250. Also shown is the NOx sensor 390 and $O_2$ sensor 395 mounted on the manifold 210 at the NOx sensor coupler 236 and the $O_2$ sensor coupler 238, respectively.

Figure 5:
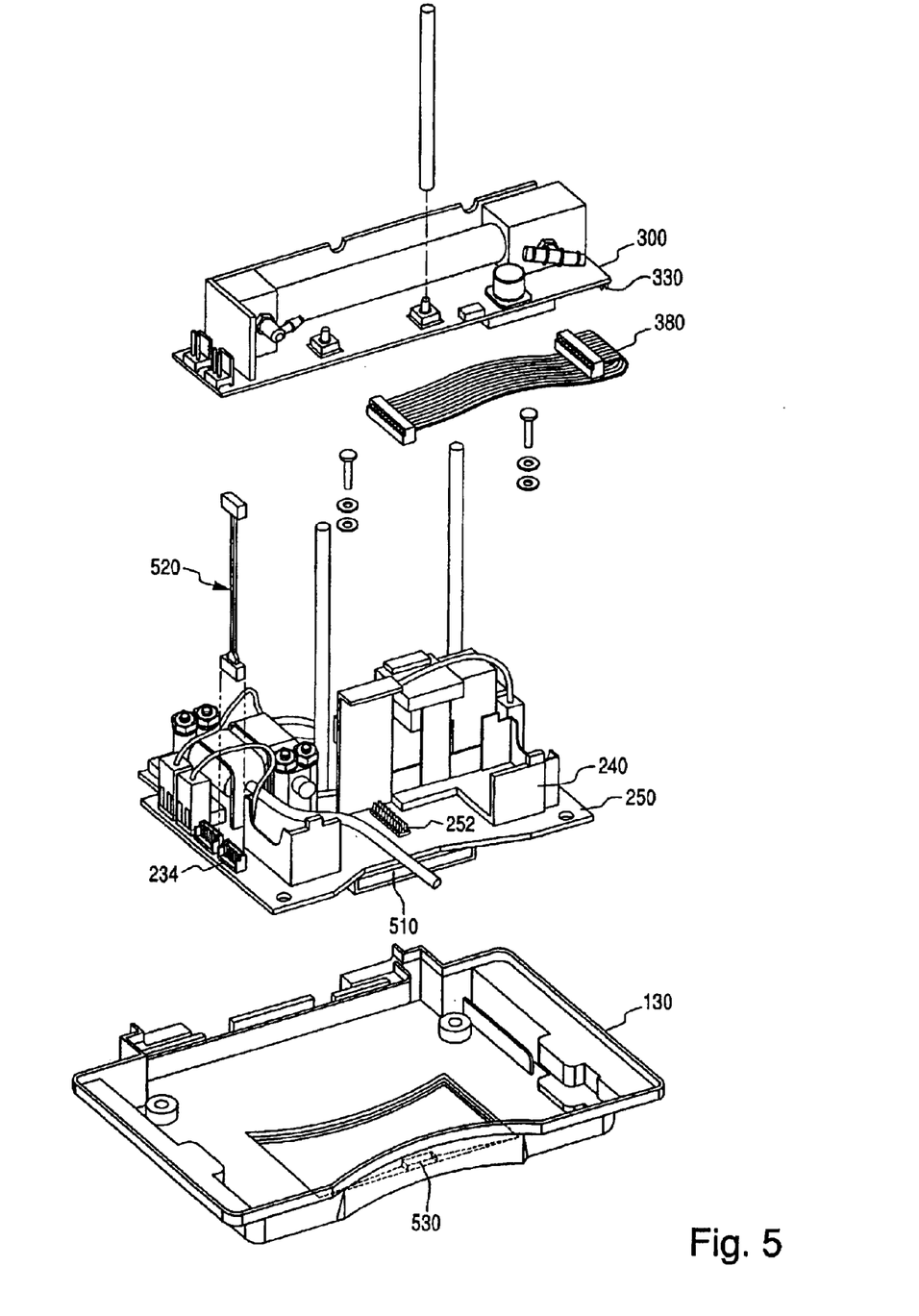
FIG. 5 is a blown-up view of the various components of the analyzer.

FIG. 5 is a blown-up view of the various components of the analyzer 100. The lower portion 130 of the housing 110 protects the lower components of the analyzer 100. A communication port window 530 that provides exterior access for a communication port 510 on the lower surface of the circuit board 250. The communication port 510 communicates with an external device, such as a data processing device, a network device, a printer, a computer, a PDA (personal digital assistant) and other devices. The communication port 510 can transmit data via a direct connection to another device or can transmit data via a wireless means. FIG. 5 also illustrates the placement of the bench 300 on the bench assembly 240. The bench 300 is powered by power cable 520 that connects the bench with the power source 234. The ribbon cable 380 connects at one end to the interface 330 and at the other end to the connector 252 provides a communication means with the bench 300 and the circuit board 250.

Figure 6:
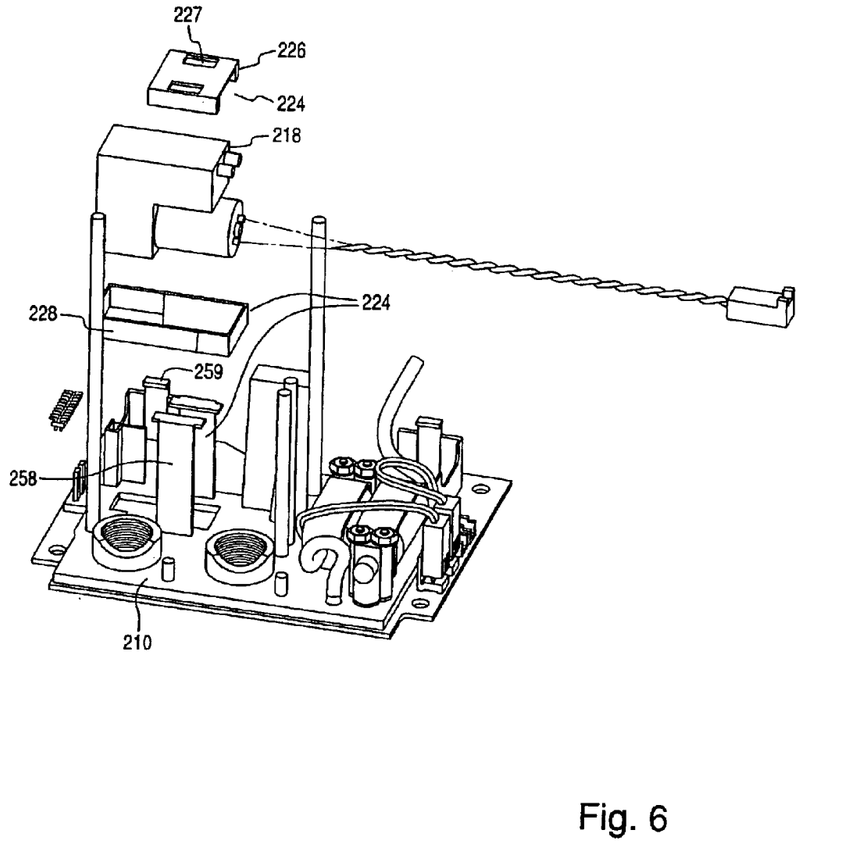
FIG. 6 is a blown-up view of an embodiment of a pump assembly of the invention.

FIG. 6 is a blown-up view of an embodiment of the pump assembly 218 of the invention. The assembly 224 secures the pump 218 to the manifold 210. The assembly 224 has an assembly base 228, an assembly cap 226 and retainers 258. The pump 218 is placed in the assembly base 228 to initially secure the pump. The assembly cap 226 has receiving slots 227 to receive the mating portion 259 of the retainers 258. The assembly cap 226 along with the retainers 258 prevent movement, such as side to side movement, of the pump 218 when it is in operation. In an embodiment of the invention, the assembly's 224 components, individually or in combination, can be made of an elastomeric material or other dampening materials. Some examples of elastomeric material include nitrile (NBR), butyl (IIR), styrene-butadiene (SBR), polyurethane (AU/EU), Silicone (PVMQ), polyisoprene (NR), and other elastomers. Conventional pumps are solidly mounted onto the chassis and are not made from an elastomeric material, thus the vibration made it difficult for the operator to hold the device for an extended period of time. Additionally, the pump can be noisy during its operation. Because of the properties of elastomeric material, the vibration is kept to a minimum and the noise from the pump 218 can be absorbed by the elastomeric assembly 224. Therefore, the analyzer 100 is more comfortable to use and can be held for a longer extended period of time, thus more tests can be conducted by the operator.

In an alternate embodiment, the individual or the combination of the assembly components (base, cap, retainers and other components) can be made from a semi-rigid or rigid material. Preferably the semi-rigid or rigid material can absorb the vibration and/or the noise of the pump.

Figure 7:
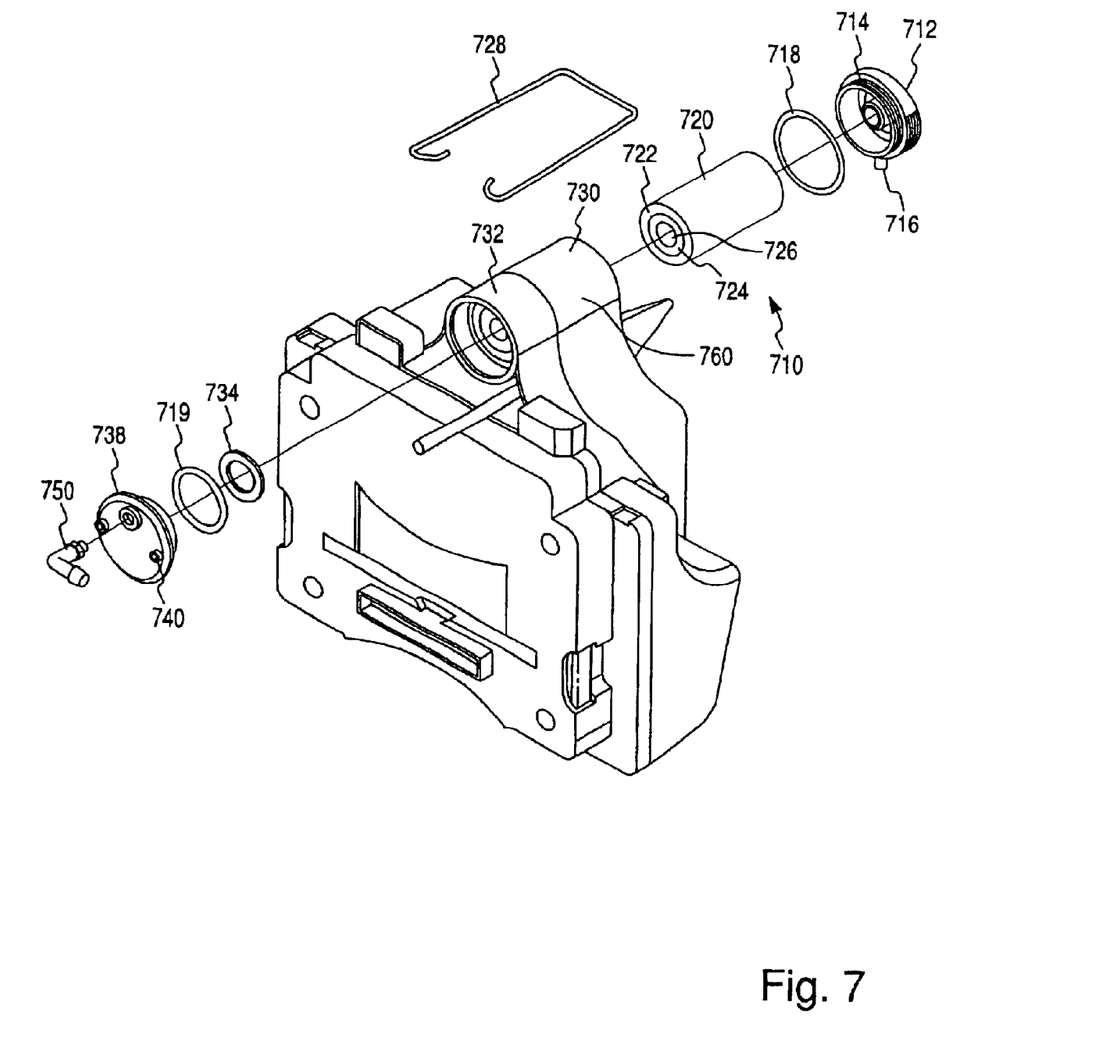
FIG. 7 is a blown-up illustration of the filter of an embodiment of the invention.

FIG. 7 is a blown-up illustration of the filter 710 of an embodiment of the invention. The filter 710 is a multi-stage filter having a filter cap 712, O-rings 718 and 719, primary filter element 720, filter retainer 728, filter holder 760, secondary filter element 734, filter base 738 and nozzle 750. The filter cap 712 having threads 714 secures the primary filter element 720 by being threaded into the filter holder 760. The filter cap 712 includes a filter connector 716 that can be hooked up to a hose that allows sample emission gases to enter the analyzer from the exterior. O-ring 718 provides a seal between the filter cap 712 and the filter holder 760. The filter holder 760 includes an upper portion 730 and a lower portion 732 that can be threaded with the filter cap 712 and the filter base 738, respectively. The holder 760 and/or the filter cap 712 can be made of a clear material, such as polycarbonate (PC) so that the operator can view the accumulation of condensation and execute a purge function at the appropriate time. Additionally, the polycarbonate can also be used in other portions of the analyzer 100 because it is a high impact material and can provide protection of the analyzer and its components should the analyzer be dropped.

The emission gases are directed to the filter element 720 by the pump 218, where the gases pass through an outer filter element 722 where the larger particulate and "rough water" are removed. The sample emission gases can contain water or condensation as they travel in the hoses to the filter 710 due to temperature changes from the hot emission and ambient hoses. The emission gases then travel through the inner filter element 724 where additional filtering occurs to remove the smaller particulate and then to the annular area 726. The filtered emission gases then travel to the secondary filter element 734 where additional filtering can be accomplished. The O-ring 719 seals the filter base 738 to the lower portion 732 so that the emission gases do not escape. The filter base 738 has the nozzle 750 so that the filtered air can travel to the sensors for analysis. The filter base 738 also has a pair of retaining holes 740, which can provide a mating surface for an end of the filter retainer 728. The filter retainer 728 further retains the filter 710 to the analyzer 100.

The filter 710 is constructed and designed to reduce contamination and condensation and provides for a more accurate reading of the samples. Conventional filters require that the emission gases travel from the outside to one filter via a hose then to another filter by another hose and then to another filter via still another hose. As the emission gases travel in the hoses, it can get contaminated because of cracking and aging hoses and/or condensation can occur due to the many hoses that the gases must travel through to get to the filter. By having a multi-stage filter, where the filters are close to each other and no additional hoses are required between the filters, then chances of contamination and condensation are reduced. Additionally, the life of the filter can last longer because the filter is encased and sealed in the filter holder 760 and it does not have to filter out other external elements that can get into the filter other than from the sample hose.

The filter connector 716 is also used to purge the water from the filter holder 760. Over time, condensation will build up in the filter holder 760 and needs to be purged so that accurate readings of the emission gases can be taken. The operator can actuate the pump 218 to purge the liquid from the filter holder 760 and out the filter connector 716. However, for optimal purging, the filter connector should be in a certain orientation, preferably in the general direction of gravity. Because the analyzer 100 is lightweight and portable, the operator can set it down in various orientations, and thus, the analyzer may not be in the preferred orientation for purging. If the operator believes he purged the water from the filter holder 760, then he will believe that the readings are accurate when they may not be.

Figure 8:
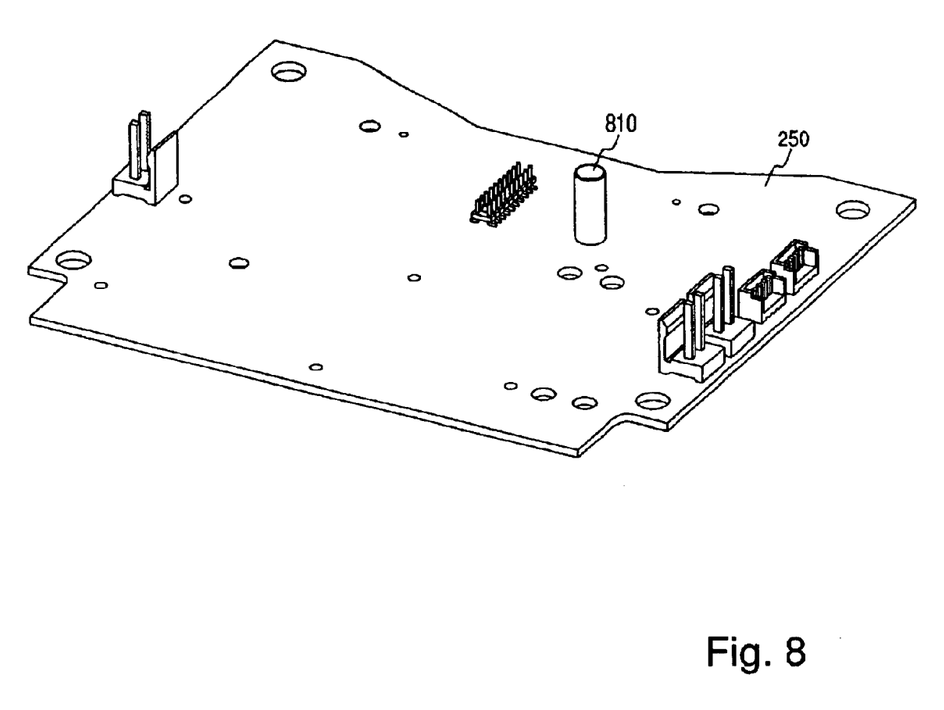
FIG. 8 illustrates an embodiment of an orientation device of the invention.

FIG. 8 illustrates an embodiment of an orientation device of the invention. In one embodiment of the invention, a tilt switch and/or accelerometer are used to notify the operator if the analyzer's 100 current orientation is preventing a satisfactory purging of the water. Conventional tilt switch can be used, such as a tilt switch 810 that is positioned on the circuit board 250. The tilt switch 810 can contain mercury, which can move based on the orientation of the tilt switch, and can detect changes in movement around them. The tilt switch can determine the orientation on all axis, such as X-axis, Y-axis, Z-axis, and any other axis. Additionally, accelerometer can also detect changes in the orientation of the analyzer 100. The accelerometer can be a one-axis, a two-axis, a three-axis accelerometer or as many axis type accelerometer, as desired. The tilt switch 810 and the accelerometer can communicate its data to the circuit board 250, which can act like a signal conditioner, and can relay the orientation data to a controller on the bench 300. Although tilt switches and accelerometers can be used, other devices that can detect orientation of the analyzer 100 can be used, such as a GPS (Global Position System), or magnetic sensitive devices.

With the assistance of the tilt switch and/or accelerator, the analyzer 100 can notify the operator that it is not in the desired orientation for a purge, should the operator attempt to purge the water. The desired orientation can be preselected or predetermined so that purging only occurs when the analyzer is in the proper orientation. Thus, the operator can be assured that the purge went as expected and can rely on the readings from the analyzer 100. Additionally, if the purge function is automatic (discussed below) such as based on a certain time, in a certain amount of water or automatically as part of another operation, or other operations, and if the analyzer is not in the preferred orientation, the operator can be alerted or the purge function may not be performed. By alerting the operator of the incorrect orientation, the operator can reorient the analyzer 100 to the desired purging orientation. The operator is alerted visually, audibly, and tactically. A display or remote means, which can include an integrated display or a remotely located display. The remote means can communicate with the analyzer 100 via a wireless means or a connected means, such as Ethernet (wired and wireless).

The purging of the water from the analyzer 100 and the zero out can be done automatically, manually, or combined with other functions. Before a live reading of the emission gases is taken, the ambient air is taken into the analyzer so that the sensors can be zeroed out or can reset to take new readings. Additionally, the purge function can also be performed after the zero out. The purge function can also be performed before the zero out function. In another embodiment of the invention, the purge function and/or the zero function can be automatic, such as after startup, after the analysis is completed, after a certain amount of time has passed while the analyzer is on, after a number of samples have been taken, or any other time period or event.

In one embodiment of the invention, preferably when the operator activates the live reading mode of the analyzer 100, the analyzer can automatically purge, and then zero out. Alternatively, when the live reading mode is activated, the analyzer can automatically zero out then purge. In another embodiment, when the live reading mode is activated, the analyzer 100 can automatically and simultaneously purge and zero out. By having the purge and/or zero functions done automatically, the operator can concentrate on the analysis and does not have to remember when to purge and/or zero out.

Figure 9:
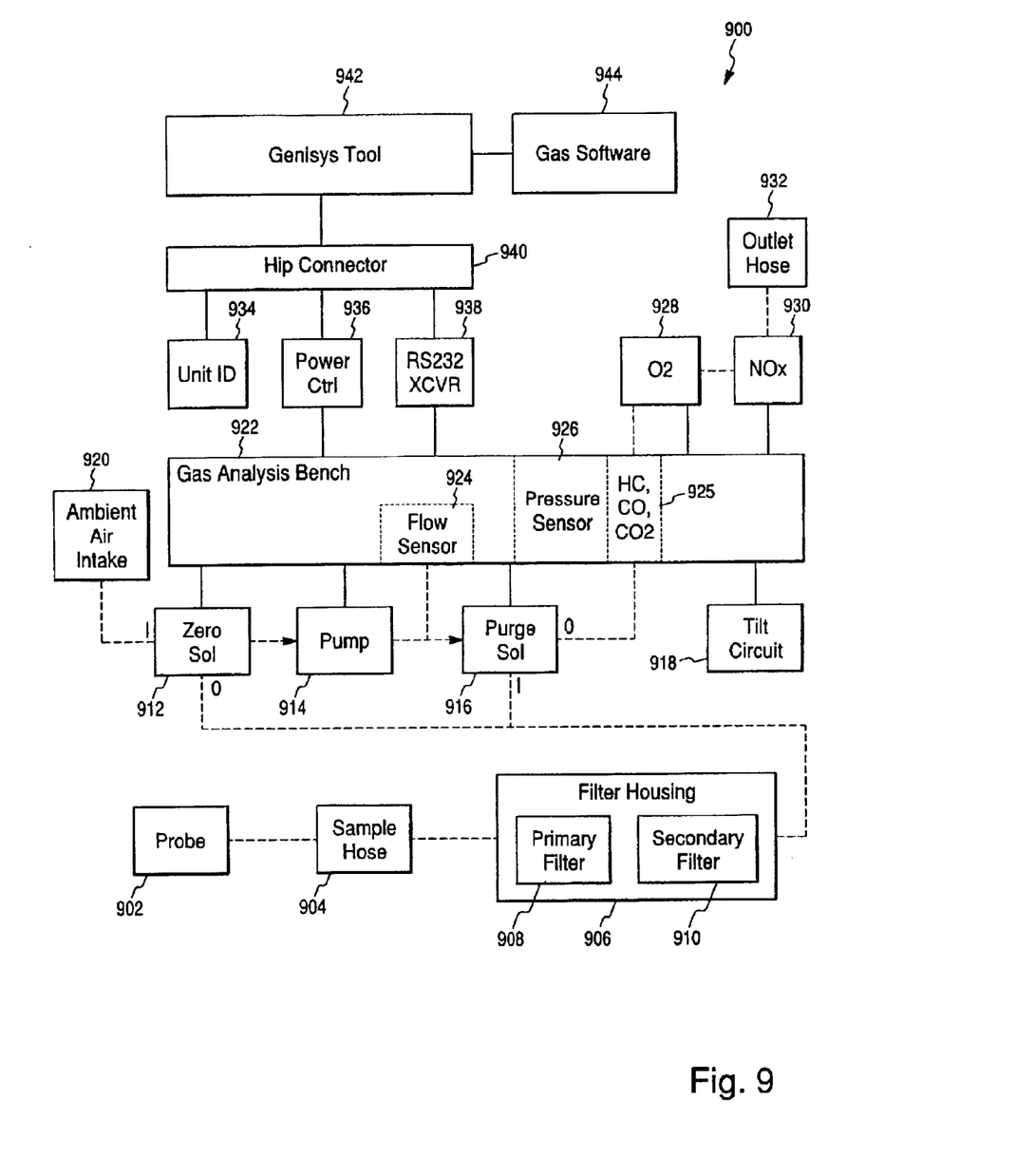
FIG. 9 is a block diagram of an embodiment of an analyzing system of the present invention.

FIG. 9 is a block diagram of an embodiment of an analyzing system 900 of the present invention. The analyzing system 900 can include an analyzer and an optional diagnostic device, such as the Genisys™ 942 that contains a gas analyzing software 944. The analyzer of the analyzing system 900 can include the analyzer 100, whose basic operation is explained herein and below.

A probe 902 is inserted or located near an exhaust system of a vehicle (not shown) and collects emission gases, which travels down a sample hose 904 to a filter housing 906. The filter housing 906 includes a primary filter 908, which can have two additional filters (inner and outer filter), and a secondary filter 910. The outer filter may be designed, for instance, to filter particulates greater than approximately 1 micron, while the inner filter may filter particulates greater than 0.3 microns. The primary filter 908 will remove most of the particulates and any condensation. The secondary filter 910 is designed to remove remaining particulates and condensation. The secondary filter may be comprised of a gasket material such as TriSeal F-217 LDPE foam, for example, with a 0.040 inch thickness. The secondary filter provides additional protection for preventing passage of particulates and fluids into the gas analyzer system which may not have been filtered out by the primary filter's inner and outer filter. Otherwise, any fluid entering the gas analyzer could adversely affect gas measurements and also be potentially damaging to the internal components of the analyzer such as the bench 300 and its associated components.

After the emission gases are filtered, the gases can travel through a zero solenoid 912, which at this point is shown in the inactive position, to a pump 914. The zero solenoid 912, during the zero out function, will open the pathway from an ambient air intake 920 and shutoff the gas pathway from the filter housing 906. The ambient air allows a baseline for the sensors 925, 928 and 930 to reset to zero, so that a live reading function can occur and an accurate reading can be made.

The pump 914 circulates the emission gases throughout the analyzer. The emission gases are then pumped to a purge solenoid 916, which allows the gases to travel to the gas analysis bench 922. The purge solenoid, when in the purging mode, can purge by closing the pathway to the bench 922 and open the pathway to the filter housing 906. The zero solenoid 912 will close the pathway from the filter housing 906 and open the pathway from the ambient air intake 920. The pump 914 will draw in air from the air intake 920 and pump air through the purge solenoid 916 and to the filter housing 906 and force the water to purge out the sample hose (which can have the probe 902 removed or attached).

The purge function (whether automatic or manual) may not occur properly if the analyzer is not in the desired purging orientation. A tilt circuit 918 is provided to determine the orientation of the analyzer. The tilt circuit 918 can include tilt switches and/or accelerometer or other orientation determining devices. The tilt circuit 918 will alert the operator if the analyzer is not in the desired orientation when a purge function is activated so that the operator can make the appropriate corrections.

At the bench 922, the emission gases (CO2, CO and HC) can be analyzed with a NDIR. The bench 922 includes a flow sensor 924 to ensure that the gases are flowing adequately for an accurate reading and a pressure sensor 926 to determine the altitude of the device, which can effect the reading. After the bench 922, the gases are pumped to the $O_2$ and NOx sensors 928, 930, where the respective gas readings can occur. Afterwards, the gases can be exhausted via an outlet hose 932.

Additional components of the analyzer can include the unit ID 934 so that if the analyzer is coupled to another device, such as the Genisys™, the analyzer would be identified. A power connection 936 and communication port 938 are also provided to communicate with other devices via a wire or wirelessly. A hip connector 940 can connect the analyzer with another device.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for filtering gases in a gas analyzer device comprising the steps of:
    providing a filter holder having an upper portion and a lower portion;
    locating a first filter element having a two stage particulate filter comprising an inner filter element and an outer filter element in said upper portion of said filter holder;
    locating a second filter element in said lower portion of said filter holder;
    receiving a gas in said filter holder;
    passing said gas through said first filter element; and
    passing said gas through said second filter element.

2. The method of claim 1, further comprising:
    analyzing the filtered gas after it has passed through both the first and second filter elements.

3. A multi-stage filtration assembly for a gas analyzer system comprising:
    a filter bolder forming a chamber having a lower portion and an upper portion;
    a filter element located in said chamber, said filter element having a first filter located in said upper portion of said chamber, wherein the first filter is a two stage particulate filter comprising an inner filter element and an outer filter element; and
    a second filter located in said lower portion of said chamber.

4. The assembly of claim 3, further comprising:
    a filter connector located on said upper portion; and
    a nozzle located on said lower portion.

5. The assembly of claim 3, further comprising:
    a filter cap to retain said first filter in said upper portion; and
    a filter base to retain said second filter in said lower portion.

6. The assembly of claim 5, further comprising:
    a filter connector located on said filter cap; and
    a nozzle located on said filter base.

7. The assembly of claim 6, wherein said filter cap and said filter base are threadably engagable with the upper portion and the lower portion respectively.

8. The assembly of claim 3, wherein the filter holder is made of a clear material.

9. The assembly of claim 3, wherein the outer filter element filters particulates greater than approximately 1 micron.

10. The assembly of claim 3, wherein the inner filter element filters particulates greater than approximately 0.3 microns.

11. The assembly of claim 3, wherein the second filter comprises a filtering foam.

12. The assembly of claim 11, wherein said foam is approximately 0.040 inches thick.

13. A multi-stage filtration system for a gas analyzer system comprising:
    a means for receiving a gas in a filter holder having an upper portion and a lower portion;
    a means for locating a first filter element having a two stage particulate filter comprising an inner filter element and an outer filter element in said upper portion of said filter holder;
    a means for passing said gas through said first filter element;
    a means for locating a second filter element in said lower portion of said filter holder; and
    a means for passing said gas through the second filter element located in said lower portion of said filter holder.

14. The system of claim 13, wherein the outer filter element filters particulates greater than approximately 1 micron.

15. The system of claim 13, wherein the inner filter element filters particulates greater than approximately 0.3 microns.

16. The system of claim 13, wherein the second filter element comprises a filtering foam.

17. The system of claim 16, wherein the foam is approximately 0.040 inches thick.

18. The system of claim 13, further comprising:
    a first means for retaining the first filter element in the upper portion; and
    a second means for retaining the second filter element in the lower portion.

19. The system of claim 18, wherein said first and second means for retaining are threadably engagable with said upper and lower portion, respectively.

20. The system of claim 19, wherein said first means for retaining comprises a filter cap; and
    said second means for retaining comprises a filter base.

21. The system of claim 20, further comprising:
    a filter connector coupled to said filter cap; and
    a nozzle coupled to said filter base.

* * * * *